United States Patent
Itoh et al.

(10) Patent No.: US 10,929,703 B2
(45) Date of Patent: Feb. 23, 2021

(54) METHOD APPARATUS AND PROGRAM PRODUCT FOR ENABLING TWO OR MORE ELECTRONIC DEVICES TO PERFORM OPERATIONS BASED ON A COMMON SUBJECT

(71) Applicant: LENOVO (Singapore) PTE. LTD., New Tech Park (SG)

(72) Inventors: Hiroshi Itoh, Sagamihara (JP); Toshiaki Jozawa, Koganei (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 77 days.

(21) Appl. No.: 14/996,039

(22) Filed: Jan. 14, 2016

(65) Prior Publication Data

US 2016/0203383 A1  Jul. 14, 2016

(30) Foreign Application Priority Data

Jan. 14, 2015 (JP) .............................. JP2015-004613

(51) Int. Cl.

| | | |
|---|---|---|
| *G06K 9/46* | (2006.01) | |
| *G06K 9/00* | (2006.01) | |
| *G06T 7/20* | (2017.01) | |
| *G06F 3/01* | (2006.01) | |

(Continued)

(52) U.S. Cl.
CPC ............... *G06K 9/46* (2013.01); *G06F 3/011* (2013.01); *G06F 3/017* (2013.01); *G06K 9/00335* (2013.01); *G06K 9/00355* (2013.01); *G06K 9/00375* (2013.01); *G06T 7/20* (2013.01);

(Continued)

(58) Field of Classification Search
None
See application file for complete search history.

(56) References Cited

U.S. PATENT DOCUMENTS

| | | | |
|---|---|---|---|
| 2011/0191823 A1 | 8/2011 | Huibers | |
| 2012/0030632 A1* | 2/2012 | McRae | ................... G06F 3/017 715/863 |

(Continued)

FOREIGN PATENT DOCUMENTS

| | | |
|---|---|---|
| CN | 103440095 A | 12/2013 |
| JP | 2014-016850 | 1/2014 |

(Continued)

OTHER PUBLICATIONS

Koskela, Timo, et al. "User experiences in ThrowIt: A natural UI for sharing objects between mobile devices." Next Generation Mobile Apps, Services and Technologies (NGMAST), 2013 Seventh International Conference on. IEEE, 2013.*

*Primary Examiner* — Vu Le
*Assistant Examiner* — Tracy Mangialaschi
(74) *Attorney, Agent, or Firm* — Kanzler Bean & Adamson (57) ABSTRACT

Respective actions are taken by two electronic devices based upon information captured by cameras of the devices. An image of a subject is captured with a first camera equipped in the first electronic device with a second camera equipped in the second electronic device. Form feature information of the subject is then recognized from the captured images. The first electronic device performs a first operation and the second electronic device performs a second operation responsive to recognizing the form feature of the subject.

19 Claims, 7 Drawing Sheets

(51) Int. Cl.
  *H04L 29/08* (2006.01)
  *H04N 5/225* (2006.01)
(52) U.S. Cl.
  CPC ............ *H04L 67/06* (2013.01); *H04L 67/104* (2013.01); *H04N 5/225* (2013.01)

(56) References Cited

U.S. PATENT DOCUMENTS

| | | | | |
|---|---|---|---|---|
| 2012/0249429 | A1* | 10/2012 | Anderson | G06F 3/011 345/173 |
| 2012/0317297 | A1* | 12/2012 | Bailey | H04W 4/21 709/229 |
| 2013/0141325 | A1* | 6/2013 | Bailey | G06F 3/017 345/156 |
| 2013/0169526 | A1* | 7/2013 | Gai | H04W 4/21 345/156 |
| 2014/0149859 | A1* | 5/2014 | Van Dyken | H04W 4/21 715/702 |
| 2014/0232635 | A1* | 8/2014 | Lee | G06F 3/0304 345/156 |
| 2015/0146920 | A1* | 5/2015 | Mazurenko | G06F 9/52 382/103 |
| 2015/0185856 | A1* | 7/2015 | Liu | H04N 21/4126 345/173 |
| 2015/0253863 | A1* | 9/2015 | Babin | G06F 3/017 345/156 |

FOREIGN PATENT DOCUMENTS

| | | | | |
|---|---|---|---|---|
| JP | 2014-179099 | | 9/2014 | |
| TW | 201239743 A | | 10/2012 | |
| WO | 2014/040485 A1 | | 3/2014 | |
| WO | WO-2015032208 A1 * | | 3/2015 | ........... G06F 3/0488 |

* cited by examiner

METHOD APPARATUS AND PROGRAM PRODUCT FOR ENABLING TWO OR MORE ELECTRONIC DEVICES TO PERFORM OPERATIONS BASED ON A COMMON SUBJECT

The subject matter disclosed herein relates to a technique for causing each of cameras of two or more electronic devices to take a picture of a simple operation in order to perform a cooperative operation.

BACKGROUND

There are techniques for making it easy to exchange data between electronic devices such as smartphones, tablet terminals, laptop personal computers (laptop PCs), or desktop personal computers. For example, in a technology called AirDrop, data can be transmitted from a transmitting terminal to a receiving terminal using WiFi® or Bluetooth®. Further, in a technology called Bump, terminals bump each other so that a preselected photo or video can be exchanged with each other via WiFi® or Bluetooth®.

SUMMARY

In the conventional methods, a transmitting-side electronic device and a receiving-side electronic device are identified before the start of communication, electronic devices become a transmitting side and a receiving side on a reciprocal basis after the start of communication to exchange data, or a signal is sent to one electronic device when a gesture to the other electronic device is detected to make a gesture to the one electronic device that received the signal in order to transfer data. However, it is convenient if an image shot with a camera can be used to identify a transmitting electronic device and a receiving electronic device at the same timing as the start of transfer so as to enable bidirectional data transfer. It is more convenient if the image shot with the camera can be used to cause the electronic devices to recognize either a primary device or a secondary device, respectively, in order to perform various cooperative operations.

The embodiments disclosed herein provide a method of causing two or more electronic devices to perform a cooperative operation based on an image of a linking operation shot with cameras. Also provided is a method of causing each of two or more electronic devices to perform any one of multiple different individual operations that make up a cooperative operation. Also provided is an electronic device and a computer program for implementing such a method.

The subject matter disclosed herein provides a method in which a first electronic device and a second electronic device, both equipped with respective cameras, perform a cooperative operation. A predetermined subject is shot with a first camera equipped in the first electronic device and a second camera equipped in the second electronic device. Then, each electronic device recognizes, from feature information on the shot subject, either of different individual operations that make up the cooperative operation. Then, each electronic device performs the recognized different individual operation, respectively.

According to the above configuration, the first electronic device and the second electronic device can perform individual operations different from each other and making up the cooperative operation by shooting the subject with the first camera and the second camera. The subject may be a region of a human body, and a one-action operation is performed using the region of the human body so that each electronic device can recognize each of the individual operations that make up the cooperative operation. The subject can provide common information for recognizing a predetermined cooperative operation and heterogeneous information for recognizing individual operations that make up the predetermined cooperative operation.

The common information and the heterogeneous information can be extracted from a static external feature or a dynamic external feature of the subject. The static external feature can be extracted from a physically integrated asymmetric region of the subject. The dynamic external feature can be extracted from motion information on the subject, such as a swinging cycle or a rotating speed, or from a change in shape, pattern, or color of the static subject.

The cooperative operation is recognized from the shot subject so that the first electronic device and the second electronic device can establish peer-to-peer wireless communication. In this case, the first electronic device and the second electronic device can exchange extracted pieces of heterogeneous information with each other through wireless communication, and perform the individual operations, respectively, when determining that the pieces of heterogeneous information are contradictory information. Further, the first electronic device and the second electronic device can exchange pieces of common information with each other through wireless communication, and perform the individual operations, respectively, when determining that the pieces of common information match.

The cooperative operation can be a data transfer operation, the individual operation of the first electronic device can be a data transmission operation, and the individual operation of the second electronic device can be a data reception operation. Further, the cooperative operation can be an input device switching operation, the individual operation of the first electronic device can be an operation for stopping an input device of the first electronic device, and the individual operation of the second electronic device can be an operation for transmitting, to the first electronic device, input information to an input device of the second electronic device.

Further, the cooperative operation can be an operation for interrupting and resuming an execution environment of an application program, the individual operation of the first electronic device can be an operation for transmitting, to the second electronic device, data being edited in an application program executed by the first electronic device, and the individual operation of the second electronic device can be an operation for receiving the edited data from the first electronic device and applying the data to an application program corresponding to the application program of the first electronic device.

Further, the cooperative operation can be an operation for switching the transfer destination of a streaming file to be downloaded from a server, the individual operation of the first electronic device can be an operation for changing the transfer destination of the currently downloaded streaming file to the second electronic device, and the individual operation of the second electronic device can be an operation for downloading the streaming file. Further, the cooperative operation can be an operation for switching the transmission source of an output device, the individual operation of the first electronic device can be an operation for stopping transmission of data to the output device, where the data being held by the first electronic device, and the individual operation of the second electronic device can be an operation for transmitting, to the output device, data held by the second electronic device.

According to embodiments disclosed herein, two or more electronic devices perform a cooperative operation based on an image of a linking operation shot with cameras. According to certain embodiments, each of two or more electronic devices perform any one of multiple different individual operations that make up a cooperative operation. An electronic device and a program product are also provided for implementing such a method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which:

FIG. 6 is a diagram for describing a state when an input device of a smartphone 150 is changed to the laptop PC 100a;

DETAILED DESCRIPTION

Figure 1:
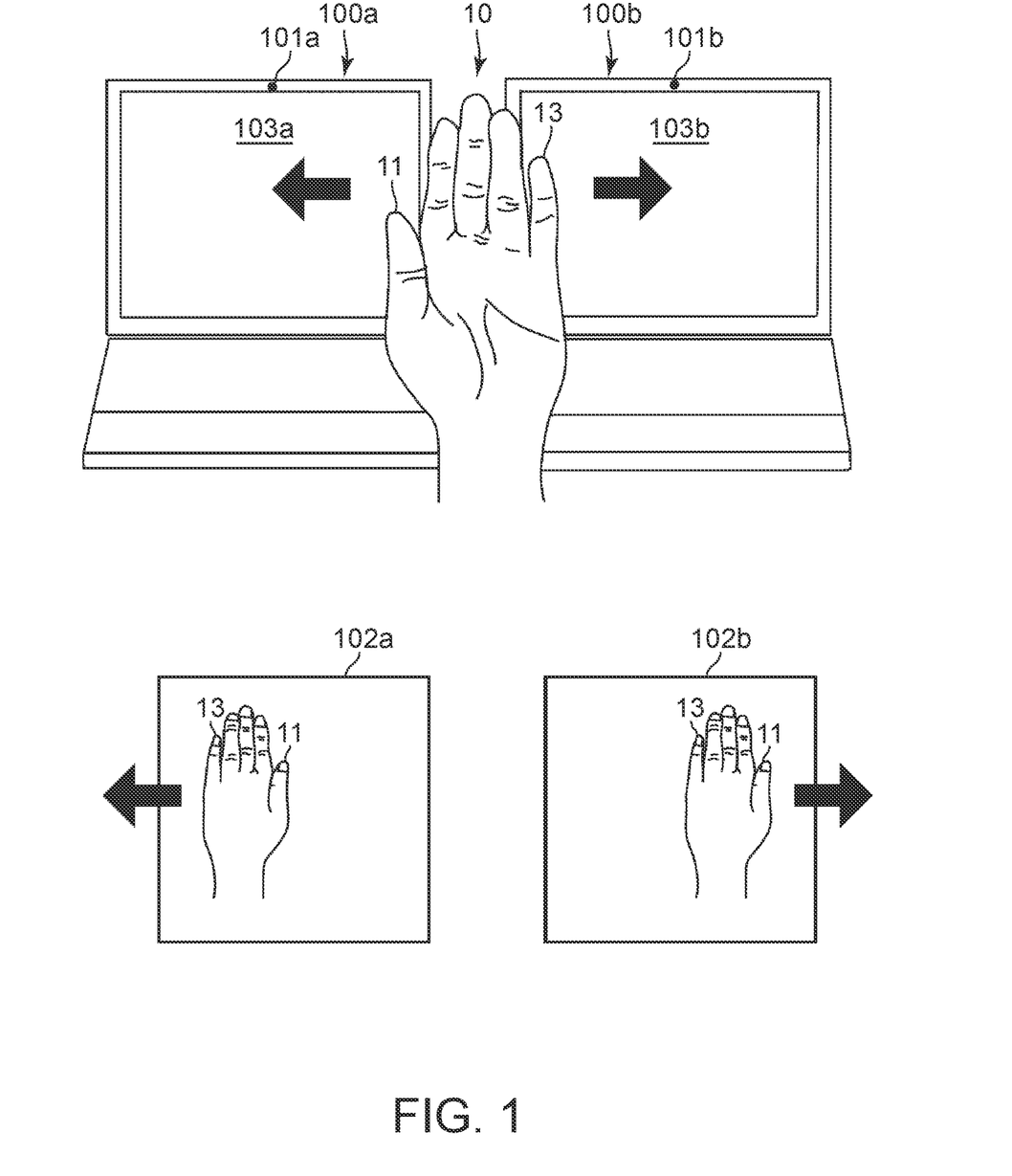
FIG. 1 is an illustration for describing a state of performing a one-action linking operation.

An outline of a cooperative operation according to the present disclosed embodiments will first be described. FIG. 1 is an illustration showing an example of the cooperative operation. A laptop PC 100a and a laptop PC 100b shown in FIG. 1 as an example of electronic devices with camera modules 101a and 101b mounted on edge frames located in upper parts of displays 103a and 103b, respectively. The laptop PCs 100a and 100b are arranged side by side so that the camera modules 101a and 101b will facing in the same direction.

In this case, an operator is swinging his or her left hand 10 to right and left about an intermediate position between the laptop PCs 100a and 100b as the center in front of the laptop PCs 100a and 100b while directing the back of the hand toward the camera modules 101a and 101b. The action of shooting the hand is an example of a linking operation to be described in detail later. The camera modules 101a and 101b operate in a video mode to generate image data at a predetermined frame rate.

The camera module 101a placed to the left as seen from the operator shoots a video of a frame 102a in which a thumb 11 reaching a right limit on the right side of the screen turns leftward and reciprocates, and the camera 101b shoots a video of a frame 102b in which a little finger 13 reaching a left limit on the left side of the screen turns rightward and reciprocates. From the video of the swinging left hand 10, the laptop PCs 100a and 100b can acquire some pieces of characteristic information distinguishable from a video of an ordinary subject.

First, the laptop PCs 100a and 100b can both acquire external feature information on the left hand 10 from the swinging left hand 10. Further, the laptop PCs 100a and 100b can both acquire an almost identical swinging cycle of the left hand 10. The same information or information recognizable to be identical, acquired by both of the laptop PCs 100a and 100b from the video of the swinging left hand 10, is an example of common information to be described in detail later.

Next, the laptop PC 100a can acquire, from the swinging left hand 10, feature information indicating that the thumb 11 swinging on the right side of the frame 102a is stopped and the laptop PC 100b can acquire feature information indicating that the little finger 13 swinging on the left side of the frame 102b is stopped, or the laptop PC 100a can acquire feature information indicating that the little finger 13 moves in the left direction of the frame 102a and the laptop PC 100b can acquire feature information indicating that the thumb 11 moves in the right direction of the frame 102b.

Further, the laptop PC 100a can acquire position information indicating that the laptop PC 100a itself is located on the left side of the swinging center as seen from the operator and the laptop PC 100b can acquire position information indicating that the laptop PC 100b itself is located on the right side of the swinging center as seen from the operator. Thus, both pieces of information different from each other and acquired by the laptop PCs 100a and 100b respectively from the shot video of the swinging left hand 10 are an example of heterogeneous information to be described in detail later.

When the video of the swinging left hand 10 is shot, the laptop PCs 100a and 100b acquire common information and heterogeneous information, respectively, to perform a cooperative operation. Description will be made by exemplifying a data transfer operation made up of a transmission operation and a reception operation as the cooperative operation. The laptop PCs 100a and 100b acquire common information, respectively, to start the data transfer operation, and acquire heterogeneous information to cause one PC to operate as a transmitting device and the other PC to operate as a receiving device. The transmitting device and the receiving device can be interchanged with each other by performing a linking operation such as to use a right hand or to direct the palm of the left hand 10 toward the camera modules 101a and 101b.

Next, the cooperative operation will be described in detail. It is assumed that two or more electronic devices are equipped with camera modules, respectively. The subject to be shot by each electronic device for the cooperative operation is called an operational subject. The left hand 10 in FIG. 1 is an example of the operational subject. Further, the action of shooting a video of the operational subject to cause each electronic device to perform a cooperative operation is called a linking operation. The cooperative operation corresponds to a unified operation realized by the two or more electronic devices as a whole, or an operation for realizing a common goal.

The cooperative operation is made up of multiple individual operations different from each other and performed by respective electronic devices. In an example, the cooperative operation is performed by the electronic devices in cooperation with each other while exchanging information with each other wirelessly or with a wired connection after each electronic device recognizes a linking operation from an image shot with the camera module to start the cooperative operation. In another example of the cooperative operation, when each electronic device recognizes a linking operation, predefined, predetermined individual operations are performed without exchanging information after that.

The operational subject and the linking operation provide each electronic device with common information and heterogeneous information. Because of an external feature, such as shape, color, or pattern, capable of realizing its potential as a subject, the operational subject provides common information and heterogeneous information, or either of them. The external feature may be a static feature unchanged with time, or a dynamic feature changed with time. As an example of the dynamic external feature, motion information such as a cycle of reciprocating motion of the operational subject or the rotating speed of rotational motion can be cited. As another example of the dynamic external feature, blinking of light, a change in luminescent color, or a change in the subject such as to place his or her hand on an eye can be cited.

The operational subject has one or more external features that may provide common information. As an example of the common information, the swinging left hand 10 shot in a predetermined size can be cited. Further, the operational subject may have an external feature recognizable to be different from the other external feature from images shot by the respective electronic devices so that the operational subject can provide heterogeneous information. As an example of the heterogeneous information, the external features of the thumb 11 and the little finger 13 that form part of the left hand 10 as the operational subject can be cited. The operational subject may be a physically integrated object, or a combination of objects physically separated as long as the operational subject is an object capable of performing a linking operation. The physically integrated object can be an asymmetric region having a static external feature or a dynamic external feature capable of providing heterogeneous information. As an example, a region of a human body, such as a hand or an arm, has asymmetry.

The linking operation corresponds to a unilateral action to cause each electronic device to shoot the operational subject without waiting for a response from the other electronic device performing the cooperative operation. Therefore, such an aspect to cause the other electronic device to shoot the subject after waiting for the result of an operation started with shooting of the subject by the one electronic device is excluded from the category of linking operations in one embodiment. The linking operation can give the timing at which each electronic device shoots the operational subject to start the cooperative operation.

The linking operation for causing the respective electronic devices to shoot the physically integrated operational subject at the same time can give the timing of starting the cooperative operation. The linking operation for causing the respective electronic devices to shoot the physically integrated operational subject at the same time is referred to herein as a one-action operation. The swinging of the left hand 10 in FIG. 1 corresponds to the one-action operation. The linking operation is different from a simple gesture that keeps each electronic device from recognizing heterogeneous information, such as the operation of the respective electronic devices to recognize the same event after shooting a gesture of swinging an arm.

The common information contains distinguishability, which causes each electronic device to recognize a specific cooperative operation, and synchronism, which gives the timing of starting the cooperative operation. The distinguishability can be given by the external feature of the operational subject, and the synchronism can be given by the linking operation. In an example, the synchronism can be indicated by the timing of the operational subject to provide the distinguishability to each electronic device. The heterogeneous information causes respective electronic devices to recognize individual operations different from each other and making up a predetermined cooperative operation. The heterogeneous information may contain the common information. As an example, the thumb 11 of the left hand 10 can provide common information indicative of data transfer and heterogeneous information indicative of a transfer source, and the little finger 13 of the left hand 10 can provide common information indicative of data transfer and heterogeneous information indicative of a transfer destination.

Figure 2:
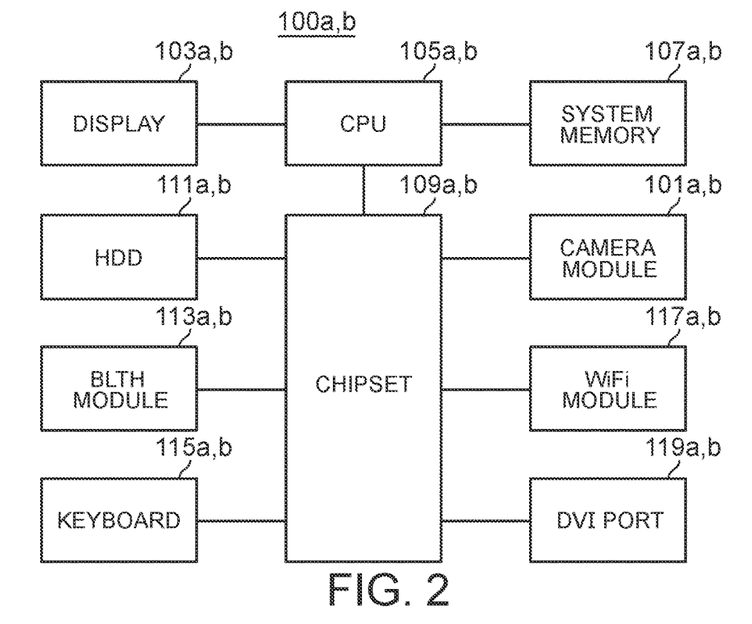
FIG. 2 is a functional block diagram showing the configuration of a laptop PC 100a, 100b.
Figure 3:
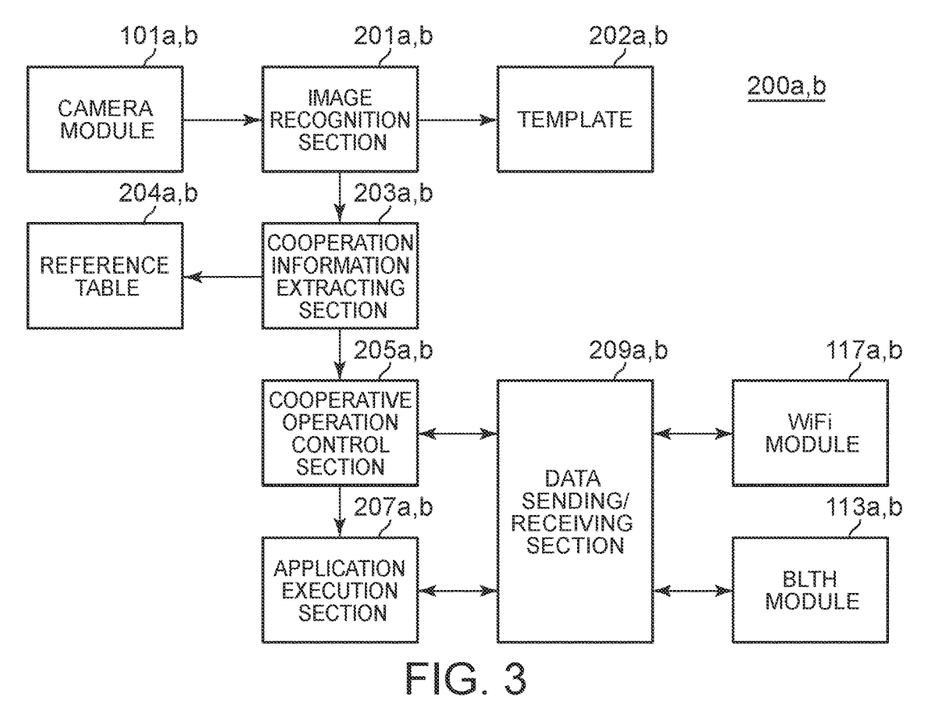
FIG. 3 is a functional block diagram showing the configuration of a cooperation system 200a, 200b.

FIG. 2 is a schematic functional block diagram of the hardware configuration of the laptop PC 100a, 100b in a cooperation system 200 (FIG. 3). Since the hardware can be common between the laptop PCs 100a and 100b to implement the embodiment, a and b are suffixed to the reference numeral of each component to distinguish therebetween.

A CPU 105a, 105b incorporates a graphics core, and a display 103a, 103b and a system memory 107a, 107b are connected to the CPU 105a, 105b. A chipset 109a, 109b incorporates a controller for various interfaces. An HDD 111a, 111b, a Bluetooth (registered trademark) module (BLTH module) 113a, 113b, a keyboard 115a, 115b, a camera module 101a, 101b, a WiFi module 117a, 117b, a DVI port 119a, 119b, and the like are connected to the chipset 109a, 109b.

FIG. 3 is a functional block diagram for describing the configuration of a cooperation system 200a, 200b mounted in an electronic device such as the laptop PC 100a, 100b. The cooperation system 200a, 200b can be realized in cooperation with hardware, such as the CPU 105a, 105b, the system memory 107a, 107b, and the chipset 109a, 109b. Non hardware components may include the camera module 101a, 101b, the WiFi module 117a, 117b and the BLTH module 113a, 113b, and software such as a device driver stored in the HDD 111a, 111b, an operating system, and an application program.

An image recognition section 201a, 201b acquires feature information from image data received from the camera module 101a, 101b at a predetermined frame rate. The image recognition section 201a, 201b refers to a template 202a, 202b to extract common information and heterogeneous information on an operational subject that match the feature information. The template 202a, 202b is made up of feature information corresponding to common information and heterogeneous information provided by the external feature and the linking operation of the operational subject. The heterogeneous information may contain the common information.

Plural pieces of common information can be prepared according to the number of cooperative operations. When the operational subject is a region of a human body, the external feature such as the back of the right/left hand, the palm of the right/left hand, or the right/left arm can be set as common information. Further, the common information can be a swinging cycle of a hand swinging to right and left or an arm swinging up and down. Plural pieces of heterogeneous information can be associated with each piece of common information depending on the number of devices that perform a cooperative operation. The heterogeneous information can be each finger when the operational subject is a hand, or right and left arms when the operational subject is the arms. The image recognition section 201a, 201b outputs, to a cooperation information extracting section 203a, 203b, distinction data indicative of the common information and the heterogeneous information extracted from the template 202a, 202b.

The cooperation information extracting section 203a, 203b refers to a reference table 204a, 204b to generate control data on a cooperative operation corresponding to the distinction data received. In the reference table 204a, 204b, linking data composed of control data on the cooperative operation associated with distinction data corresponding to the common information and control data on individual operations associated with distinction data corresponding to the heterogeneous information are registered. For example, distinction data corresponding to the back of the left hand 10 is associated with control data corresponding to a cooperative operation called a data transfer operation. Further, distinction data corresponding to the thumb 11 can be associated with control data called a transmission operation and distinction data corresponding to the little finger 13 can be associated with control data called a reception operation.

A cooperative operation control section 205a, 205b controls the operation of a data sending/receiving section 209a, 209b and an application execution section 207a, 207b based on control data received from the cooperation information extracting section 203a, b, or control data received from a laptop PC as a partner of the cooperative operation. The application execution section 207a, 207b includes the display 103a, 103b and the keyboard 115a, 115b, and executes an application program related to the cooperative operation. The data sending/receiving section 209a, 209b controls wireless communication via the WiFi module 117a, 117b and the BLTH module 113a, 113b.

Figure 4:
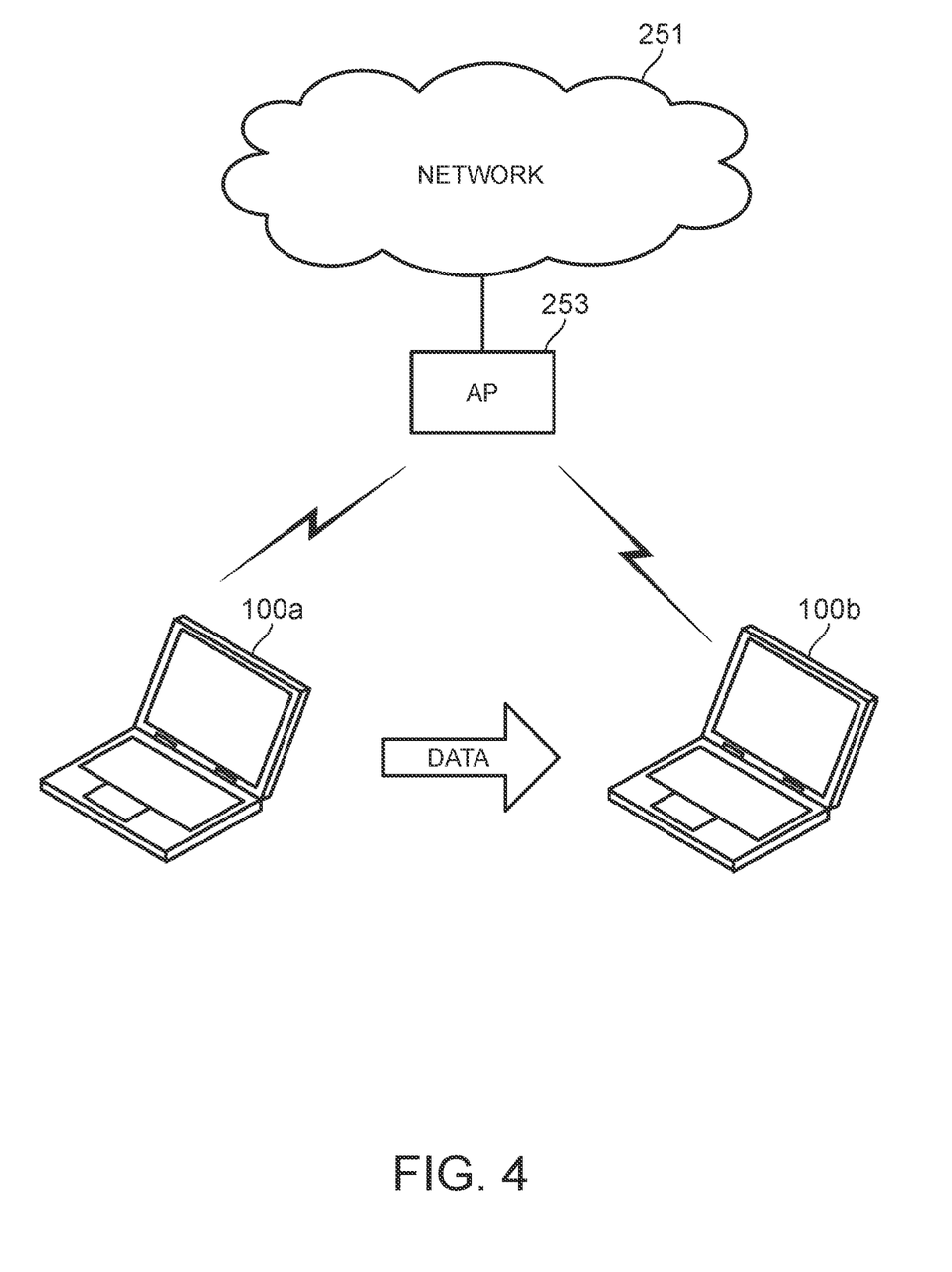
FIG. 4 is a diagram for describing a state when data is transferred from the laptop PC 100a to the laptop PC 100b.
Figure 5:
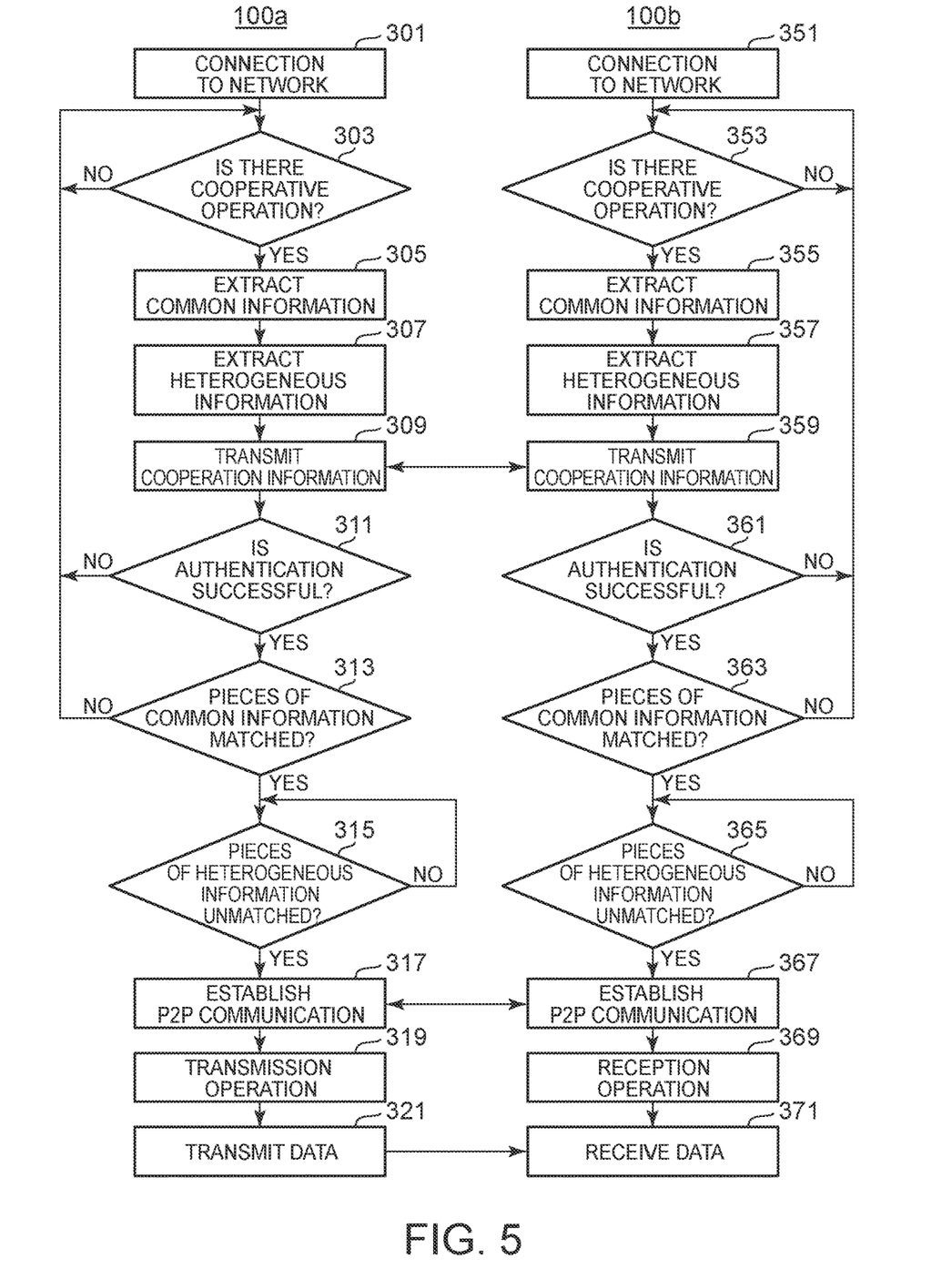
FIG. 5 is a flowchart for describing the operation of the cooperation system 200 when data is transferred from the laptop PC 100a to the laptop PC 100b.

FIG. 4 is a diagram for describing a state when data transfer as a cooperative operation is performed from the laptop PC 100a to the laptop PC 100b with a linking operation. FIG. 5 is a flowchart for describing the operation of the cooperation systems 200a and 200b at this time. In FIG. 5, blocks 301 to 321 correspond to the operation of the laptop PC 100a, and blocks 351 to 371 correspond to the operation of the laptop PC 100b. The cooperative operation for data transfer is made up of a transmission operation performed by the laptop PC 100a and a reception operation performed by the laptop PC 100b. In blocks 301 and 351, the laptop PCs 100a and 100b are connected to a backbone network 251 via an access point (AP) 253, respectively.

The laptop PCs 100a and 100b may attribute to the same user or different users, respectively. When being connected to the network 251, global IP addresses or private IP addresses (hereinafter, IP addresses) are assigned to the laptop PCs 100a, 100b, respectively. Since different values are given to these IP addresses by a DHCP server or a router each time of the connection to the network 251, the laptop PCs 100a and 100b do not recognize each other's IP addresses at the moment they are connected to the network 251.

The laptop PCs 100a and 100b before acquiring each other's IP addresses can communicate with each other using mail addresses, but it takes time to take data from a mail server. The laptop PCs 100a and 100b can acquire each other's IP addresses to perform seamless communication by a communication method called peer-to-peer (P2P) where no mail server intervenes therebetween. In the cooperative operation for data transfer, the P2P communication is used as an example.

When a file to be transmitted is selected by the application execution section 207a and the IP address of the laptop PC 100b as a destination is acquired from the cooperative operation control section 205a, the laptop PC 100a as a transmitting device is in a state capable of transmitting the file from the WiFi module 117a. In the laptop PC 100b as a receiving device, the application execution section 207b may execute an application program for receiving the file, or the application program may be started during a linking operation to be described below.

Here, as shown in FIG. 1, description will be made by exemplifying a case where the operational subject is the left hand 10 and the left hand 10 is made to swing. The camera module 101a, 101b operates in a video mode or a still image mode to output image data to the image recognition section 201a, 201b at a predetermined frame rate. The image recognition section 201a, 201b compares feature information extracted from a shot image with the template 202a, 202b.

When extracting common information that matches feature information corresponding to any one of linking operations respectively registered in the template 202a, 202b, the image recognition section 201a, 201b outputs, to the cooperation information extracting section 203a, 203b, distinction data indicative of common information and heterogeneous information associated with the common information. The common information provided by the left hand 10 can be the static external feature and dynamic external feature of the swinging left hand 10, or either one of them. The heterogeneous information provided by the left hand 10 can be the static external feature and dynamic external features of the thumb 11 and the little finger 13 that swing in the right and left directions, or either one of them.

When the cooperation information extracting sections 203a, 203b output distinction data in blocks 303 and 353, respectively, the procedure proceeds to blocks 305 and 355. In blocks 305 and 355, the cooperation information extracting sections 203a and 203b refer to the reference tables 204a and 204b, and when recognizing the cooperative operation as a data transfer operation from distinction data corresponding to the common information, the cooperation information extracting sections 203a and 203b output control data indicative of the cooperative operation to the cooperative operation control sections 205a and 205b.

In block 307, the cooperation information extracting section 203a refers to the reference table 204a to output control data when recognizing an individual operation as a data transmission operation from distinction data corresponding to the heterogeneous information. In block 357, the cooperation information extracting section 203b refers to the reference table 204b to output control data when recognizing an individual operation as a data reception operation from distinction data corresponding to the heterogeneous information. The cooperative operation control sections 205a and 205b that received the control data indicative of the cooperative operation transmit broadcast frames in blocks 309 and 359 via the data sending/receiving sections 209a, 209b and WiFi modules 117a, 117b, respectively, to verify each other's eligibility for the cooperative operation.

Each of the broadcast frames contains, as user data, control data on common information, control data on heterogeneous information, authentication information, and various kinds of information necessary for the cooperative operation and data transfer, such as the file format of data to be transferred and the identifier of an application program for processing the data transfer. Note that the cooperative operation control sections 205a and 205b may transmit multicast frames instead of the broadcast frames. In blocks 311 and 361, the cooperative operation control sections 205a and 205b perform mutual authentication, for example, in a PKI system.

In blocks 313 and 363, the cooperative operation control sections 205a and 205b determine whether to have eligibility for performing the cooperative operation with each other from the control data on the common information received from the other PC and the control data on the common information received from its own cooperation information extracting section 203a, 203b. When the pieces of common information match, it is determined that there is eligibility, and the procedure proceeds to blocks 315 and 365.

In block 315, the cooperative operation control section 205a determines whether to have eligibility for a transmission operation as a linking operation confirmed in block 313 from the control data on the heterogeneous information received from the laptop PC 100b and the control data on the heterogeneous information received from the cooperation information extracting section 203a. When confirming that the control data on the heterogeneous information received from the laptop PC 100b and the control data on the heterogeneous information received from the cooperation information extracting section 203a make up the specified cooperative operation, and the pieces of heterogeneous information are contradictory to each other, the cooperative operation control section 205a determines that there is eligibility for the transmission operation. In block 365, the cooperative operation control section 205b determines that there is eligibility for a reception operation in the same manner.

When the pieces of heterogeneous information do not match and the pieces of heterogeneous information are determined to be the opposite regions of the left hand 10, such as the thumb 11 and the little finger 13, or in the case of either one, the procedure proceeds to blocks 317 and 367. When mutual authentication is successful in blocks 311 to 315, and 361 to 365, and it is determined that there is eligibility for the cooperative operation, the cooperative operation control section 205a, 205b transmits, in block 317, 367, its own IP address to the sender of the broadcast frame, and if necessary, a port number and the like to establish P2P communication.

In block 319, the cooperative operation control section 205a starts the transmission operation, and in block 369, the cooperative operation control section 205b starts the reception operation. In block 321, the cooperative operation control section 205a instructs the application execution section 207a to transfer a selected file. The application execution section 207a transmits the file from the WiFi module 117a. In block 371, the cooperative operation control section 205b instructs the application execution section 207b to receive the file and store the file in a predetermined directory. At this time, the cooperative operation control section 205b starts, if necessary, an application program for receiving the file as the target of data transfer.

Since the laptop PCs 100a and 100b establish the P2P communication, the period from the linking operation to the start of data transfer can be short. The cooperative operation control sections 205a and 205b may establish an ad hoc network or a WiFi direct network in the WiFi modules 117a and 117b to perform direct data transfer without passing through the AP 253. According to the above-mentioned procedure, when the operator performs a one-action operation, the laptop PCs 100a and 100b can perform predetermined individual operations to carry through the cooperative operation. Further, the transmitting device and the receiving device can be easily interchanged with each other by performing a linking operation for swinging the left hand 10 so that the palm thereof will be shot or a linking operation using the right hand.

The above-mentioned procedure describes an example according to disclosed embodiments, but all the elements are not essential in the present embodiments, and the order of elements is not intended to limit the present embodiments. The elements essential to the present embodiments will be as set forth in claims. For example, the order of blocks 313 and 315, and the order of blocks 363 and 365 may be changed, or either of them may be changed. In blocks 317 and 367, the example of acquiring each other's IP addresses with a linking operation is described, but the IP address of the other PC may be acquired before the linking operation to establish P2P communication.

Further, the example of using the WiFi modules 117a and 117b for file transfer is described, but the BLTH modules 113a and 113b can also be used. In this case, there is no need to transmit the broadcast frames, and one laptop PC can make a request for pairing in block 309, 359 to achieve pairing by exchanging PIN codes with each other in order to establish a communication path.

Instead of the WiFi modules 117a and 117b, near field communication (NFC) devices such as for infrared communication can also be used. Further, in addition to wireless communication, wire communication can be used for the cooperative operation. The example of performing the cooperative operation between two devices is shown, but the present embodiments can also be applied to three or more devices arranged to be able to extract common information and heterogeneous information on an operational subject with a linking operation.

The procedure in FIG. 5 can also be used to port the execution environment of an application program with a linking operation. For example, it is assumed that the laptop PC 100a is a large-size PC used only at the user's desk, and the laptop PC 100b is a small-size PC used in a conference room or a mobile environment. It is also assumed that the user is opening a browser using the laptop PC 100a and accessing websites in many tabs.

In this case, the web browser used on the laptop PC 100a until then is interrupted with a linking operation as shown in FIG. 1 so that information on an accessed website can be ported to the laptop PC 100b. The execution environment of the laptop PC 100b can also be ported to the laptop PC 100a in the same manner. The porting of the execution environment can also be applied to a document creation program and a mailer as well as the web browser.

Figure 6:
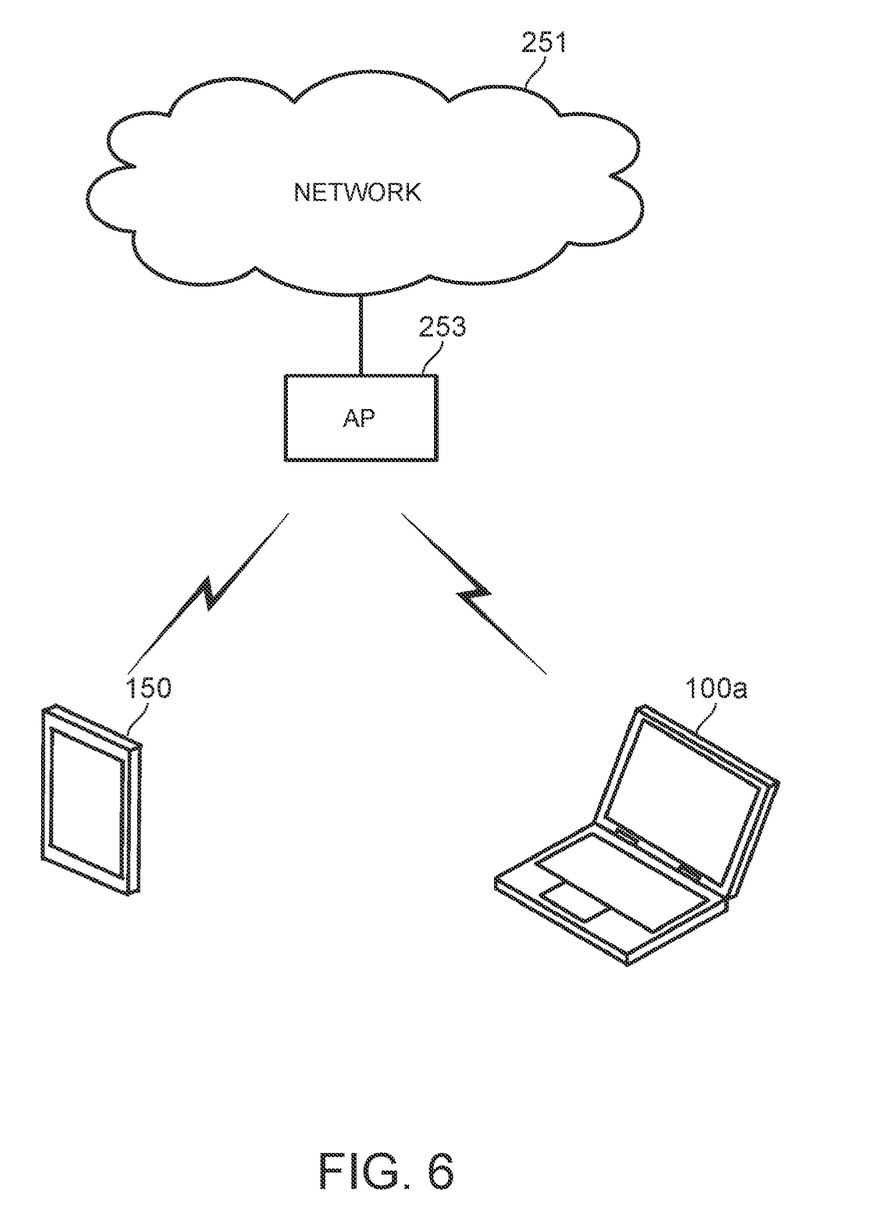

FIG. 6 is a diagram for describing a switching method for switching the input device from a touch screen of a smartphone 150 to a keyboard 115a of the laptop PC 100a with a linking operation. The smartphone 150 is equipped with the cooperation system 200b. As an example, it is assumed that the input devices to be switched are the touch screen and the keyboard, but the input devices are not necessarily limited thereto. For example, the input devices may be a small touch screen and a large touch screen. The smartphone 150 and the laptop PC 100a are in a communicable state with each other using the WiFi modules 117a and 117b via the AP 253.

When a user enters data onto a screen to be displayed by the application execution section 207b from the touch screen of the smartphone 150, the user may enter a large amount of data or the user may want to hide a software keyboard and enter data while viewing the whole screen. In such a case, the user places the smartphone 150 next to the laptop PC 100a and performs a linking operation using, for example, the left hand 10 in front of the camera modules. A cooperative operation corresponding to the linking operation can be made up of an individual operation of the smartphone 150 to stop inputting from the touch screen, process, as input data, data received from the laptop PC 100a, and hide the software keyboard if necessary, and an individual operation of the laptop PC 100a to transmit input from the keyboard 115a to the smartphone 150 through the WiFi module 117a.

In the smartphone 150, the cooperative operation control section 205b recognizes the cooperative operation and its own individual operation from control data received via the image recognition section 201b and the cooperation information extracting section 203b, and instructs the application execution section 207b to hide the software keyboard if the software keyboard is displayed on the touch screen. The cooperative operation control section 205b emulates key code, received from the laptop PC 100a via the WiFi module 117b, to key code from the touch screen, and sends it to the application execution section 207b.

In the laptop PC 100a, the cooperative operation control section 205a recognizes the cooperative operation and its own individual operation, and instructs the application execution section 207a to display an image on the display 103a if necessary to indicate that data is input from the keyboard 115a to the smartphone 150. The cooperative operation control section 205a transmits key code of the keyboard 115a to the smartphone 150 via the WiFi module 117a. The laptop PC 100a may transmit the key code by emulating it to key code of the software keyboard on the smartphone 150.

Figure 7:
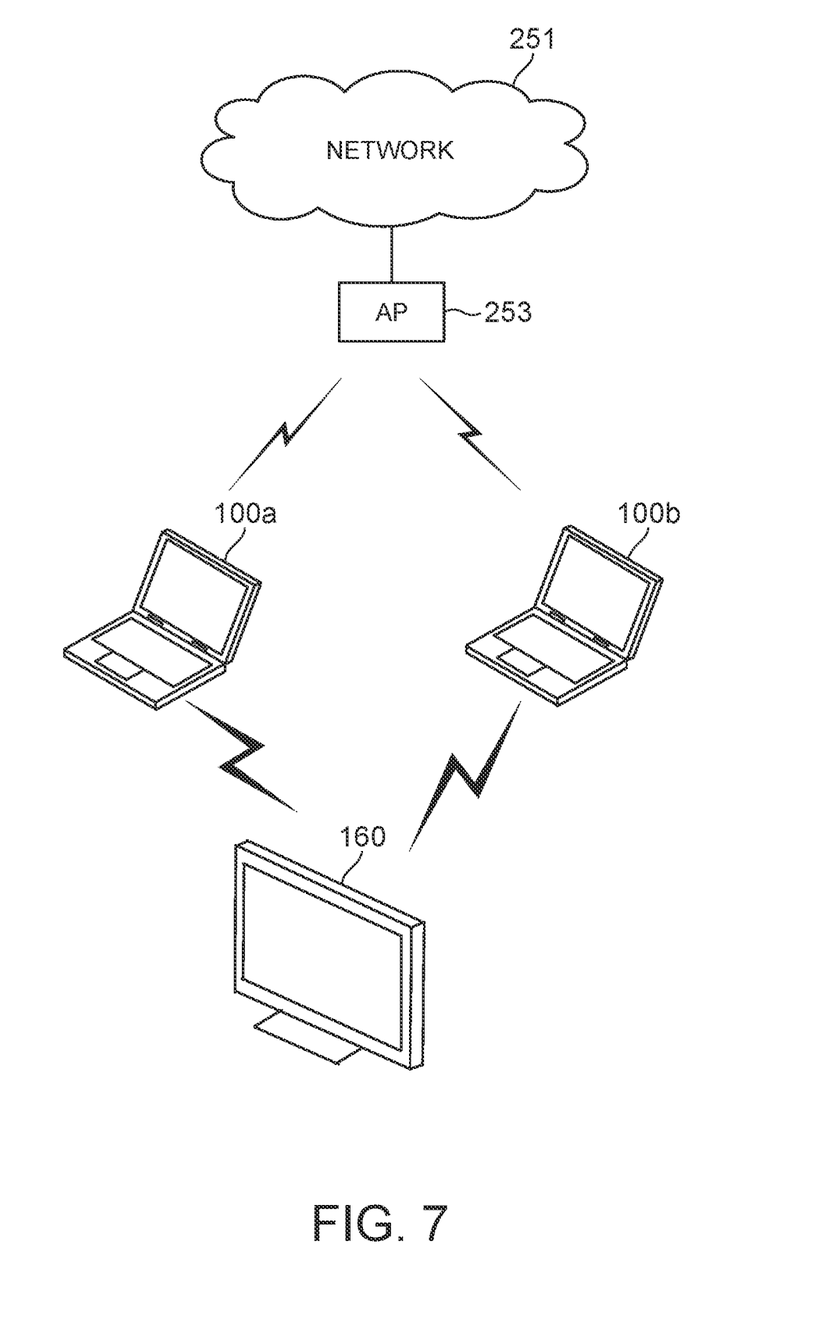
FIG. 7 is a diagram for describing a state when a transmission source for outputting data to an external display 160 is changed from the laptop PC 100a to the laptop PC 100b.

FIG. 7 is a diagram for describing method of switching the transmission source to an external display 160 as an output device from the laptop PC 100a to the laptop PC 100b with a linking operation. The output device to be switched is the external display as an example, but the output device is not necessarily limited thereto. The output device may be a printer, a projector, a speaker, or the like. In the laptop PC 100a, the application execution section 207a is outputting image data displayed on the display 103a to the external display 160 through the BLTH module 113a to display the image data on the external display 160. In the laptop PC 100b, the application execution section 207b is displaying image data on the display 103b.

Here, it is assumed that a user wants to display, on the external display 160, the image data displayed on the display 103b of the laptop PC 100b. In this case, the user places the laptop PCs 100a and 100b side by side as in FIG. 1, and performs a linking operation. When the laptop PCs 100a and 100b are located away from each other, the user may extend both arms and swing up and down so that the laptop PC 100a will recognize the left hand and the laptop PC 100b will recognize the right hand to provide common information and heterogeneous information.

A cooperative operation corresponding to the linking operation can be made up of an individual operation of the laptop PC 100a to stop outputting image data to the external display 160, and an individual operation of the laptop PC 100b to start outputting image data to the external display 160. In the laptop PC 100a, the cooperative operation control section 205a recognizes the cooperative operation and its own individual operation from control data received via the image recognition section 201a and the cooperation information extracting section 203a, and instructs the application execution section 207a to stop outputting the image data.

In the laptop PC 100b, the cooperative operation control section 205b recognizes the cooperative operation and its own individual operation from control data received via the image recognition section 201b and the cooperation information extracting section 203b, and instructs the application execution section 207b to output data, to be output to the display 103b, also to the external display 160 via the BLTH module 113b. The laptop PCs 100a and 100b can also switch the output devices, respectively, without exchanging any information at all after shooting the linking operation.

However, depending on the procedure of blocks 361 to 365, there may be a case where only the laptop PC 100a performs the individual operation and the laptop PC 100b performs no individual operation. In such a case, the display on the external display 160 will disappear. To prevent this, it is desired that the cooperative operation control section 205a should stop outputting image data after checking a state where the cooperative operation control section 205b is ready to transmit the image data. In this case, the laptop PCs 100a and 100b can mutually check each other's timings of the individual operations through the WiFi modules 117a and 117b or the BLTH modules 113a and 113b.

Figure 8:
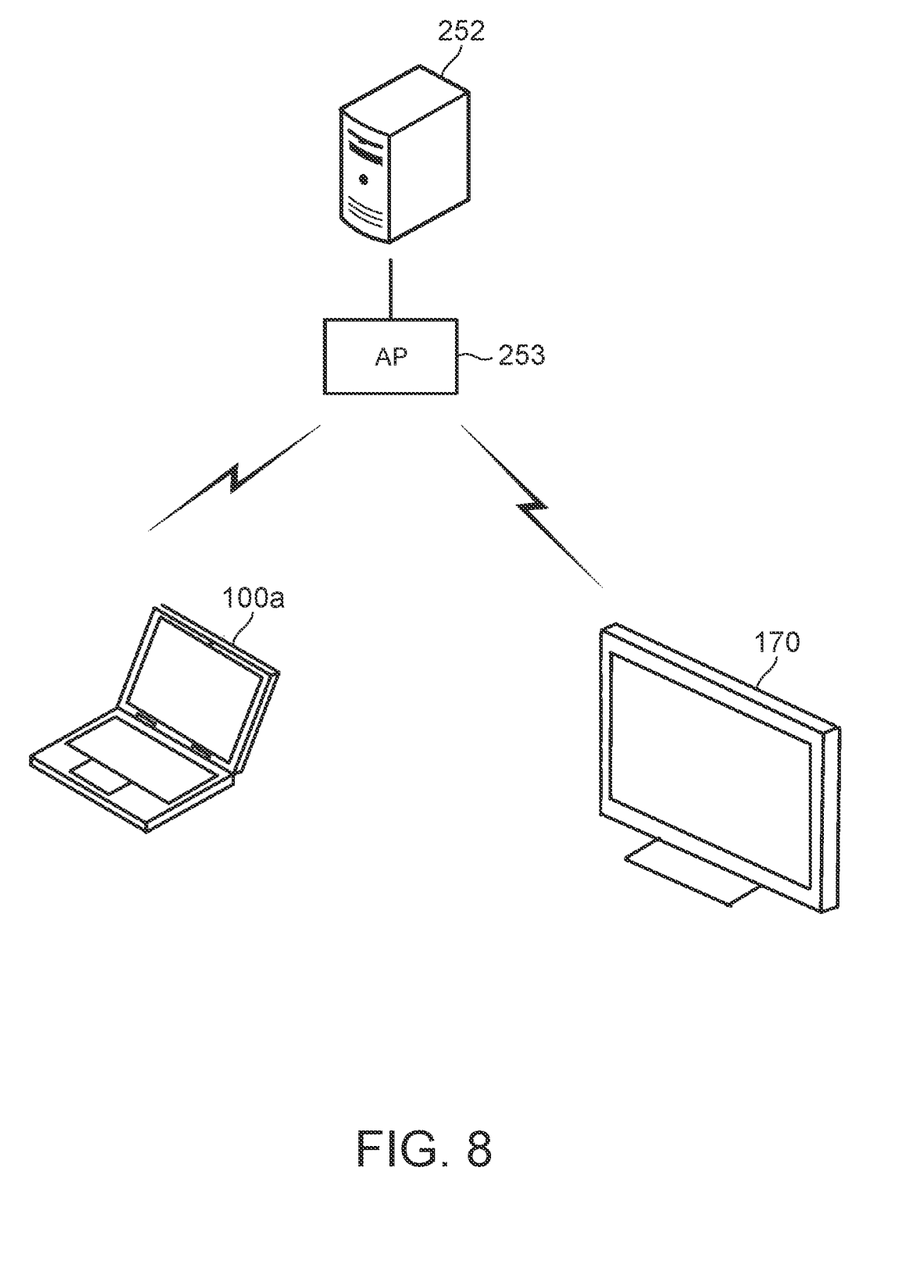
FIG. 8 is a diagram for describing a state when the download destination of a downloaded file provided by a server 252 is changed from the laptop PC 100a to a smart TV 170.

FIG. 8 is a diagram for describing a method of switching the data transfer destination of streaming data from the laptop PC 100a to a smart TV 170 with a linking operation. The smart TV 170 is equipped with the cooperation system 200b. In the laptop PC 100a, the application execution section 207a is playing a streaming file while downloading it from a network server 252 through the WiFi module 117a. Further, the smart TV 170 is not downloading the streaming file though being connected to the server 252, or is downloading a streaming file different from that being downloaded by the laptop PC 100a.

Here, it is assumed that a user wants to download a streaming file, downloaded partway by the laptop PC 100a, from a continued part in order to display it on the smart TV 170. In this case, the user places the laptop PC 100a next to the smart TV 170, and performs a linking operation. A cooperative operation corresponding to the linking operation can be made up of an individual operation of the laptop PC 100a to notify the server 252 of the stop of downloading and the position of resuming the playback, and an individual operation of the smart TV 170 to start downloading the streaming file from the server 252.

In the laptop PC 100a, the cooperative operation control section 205a recognizes the cooperative operation and its own individual operation from control data received via the image recognition section 201a and the cooperation information extracting section 203a, and sends the server 252 the IP address of a transfer destination of the streaming file and the playback time to request the server 252 to send the streaming file to the smart TV 170 from a continued position of the playback time. In the smart TV 170, the cooperative operation control section 205b recognizes the cooperative operation and its own individual operation from control data received via the image recognition section 201b and the cooperation information extracting section 203b, and instructs the application execution section 207b to receive the streaming file.

What is claimed is:
1. A method comprising:
   capturing an image of a hand of a subject with a first camera equipped in a first electronic device and with a second camera equipped in a second electronic device;

recognizing form feature information of the hand from the captured images;

extracting common information identifying the hand as a left or right hand and further identifying a palm-toward or palm-away orientation of the hand and heterogeneous information associated with an asymmetrical aspect of the hand from the form feature information, the common information captured by both the first camera and the second camera, the common information corresponding to a common operation associated with both the first electronic device and the second electronic device, the heterogeneous information captured by at least one of the first camera and the second camera and corresponding to an operation unique to one of the first electronic device and the second electronic device;

comparing the captured images to determine if the common information from the captured images comprises a match;

in response to a determination that the common information from the captured images forms the match, identifying the first electronic device and the second electronic device as eligible;

in response to a determination that the common information from the captured images does not form the match, identifying at least one of the first electronic device and the second electronic device as ineligible; and identifying a cooperative operation corresponding to the common information from the captured images and causing the first electronic device to perform a first operation of the cooperative operation, wherein the first operation is unique to the first electronic device and necessary for completion of the cooperative operation and causing the second electronic device to perform a second operation of the cooperative operation, wherein the second operation is unique to the second electronic device and necessary for completion of the cooperative operation, the first operation and the second operation corresponding to the heterogeneous information extracted from a static external feature of the subject, wherein the static external feature is a finger of the hand that is static relative to one or more other features of the subject, and one or more of the first operation and the second operation is determined based on a relative position of the static external feature on the subject.

2. The method according to claim 1, wherein capturing the image of the subject comprises capturing an image while the subject performs a one-action operation.

3. The method according to claim 1, wherein recognizing form feature information further comprises extracting a predetermined cooperative operation from the subject and the common information and the heterogeneous information correspond to a predetermined cooperative operation comprising a plurality of individual operations.

4. The method according to claim 1, wherein recognizing form feature information further comprises extracting the common information and the heterogeneous information from the static external feature of the subject.

5. The method according to claim 4, further comprising extracting the static external feature from a physically integrated asymmetric region of the subject.

6. The method according to claim 1, wherein at least one of the common information and the heterogeneous information further comprises a dynamic external feature of the subject.

7. The method according to claim 6, further comprising extracting the dynamic external feature from at least one of motion information on the subject, a change in shape, a change in pattern, and a change in color of the subject.

8. The method according to claim 3, further comprising:

causing the first and second electronic devices to recognize the cooperative operation from the image of the subject; and causing the first and second electronic devices to establish peer-to-peer wireless communication in response to the recognizing of the form feature information.

9. The method according to claim 8, further comprising causing the first electronic device and the second electronic device to exchange corresponding pieces of the extracted heterogeneous information with each other through the wireless communication, and perform the first and second operations, respectively, in response to determining that the pieces of heterogeneous information from the first and second electronic devices are contradictory.

10. The method according to claim 8, wherein the first electronic device and the second electronic device exchange pieces of the common information with each other through the wireless communication.

11. The method according to claim 3, wherein the cooperative operation is a data transfer operation, the first operation conducted by the first electronic device is a transmission operation for the data, and the second operation conducted by the second electronic device is a reception operation for the data.

12. The method according to claim 3, wherein the cooperative operation is an input device switching operation, the first operation conducted by the first electronic device is an operation for stopping an input device of the first electronic device, and the second operation conducted by the second electronic device is an operation for transmitting information to an input device of the second electronic device.

13. The method according to claim 3, wherein the cooperative operation is an operation for porting an execution environment of an application program, the first operation conducted by the first electronic device is an operation for transmitting data being edited in an application program executed by the first electronic device, and the second operation conducted by the second electronic device is an operation for receiving the data being edited and applying the data to an application program corresponding to the application program concerned.

14. The method according to claim 3, wherein the cooperative operation is an operation for switching a transfer destination of a streaming file downloaded from a server, the first operation conducted by the first electronic device is an operation for changing the transfer destination of the currently downloaded streaming file to the second electronic device, and the second operation conducted by the second electronic device is an operation for downloading the streaming file.

15. The method according to claim 3, wherein the cooperative operation is an operation for switching a transmission source of an output device, the first operation conducted by the first electronic device is an operation for stopping transmission of data to the output device, where the data being held by the first electronic device, and the second operation conducted by the second electronic device is an operation for transmitting, to the output device, data held by the second electronic device.

16. An apparatus comprising:
a processor;
a memory that stores code executable by the processor to:
  capture an image of a hand of a subject with a first camera equipped in a first electronic device and with a second camera equipped in a second electronic device;
  recognize form feature information of the hand from the captured images;
  extract common information identifying the hand as a left or right hand and further identifying a palm-toward or palm-away orientation of the hand and heterogeneous information associated with an asymmetrical aspect of the hand from the form feature information, the common information captured by both the first camera and the second camera, the common information corresponding to a common operation associated with both the first electronic device and the second electronic device, the heterogeneous information captured by at least one of the first camera and the second camera and corresponding to an operation unique to one of the first electronic device and the second electronic device;
  compare the captured images to determine if the common information from the captured images comprises a match;
  in response to a determination that the common information from the captured images forms the match, identify the first electronic device and the second electronic device as eligible; and
  identify a cooperative operation corresponding to the common information from the captured images and causing the first electronic device to perform a first operation of the cooperative operation, wherein the first operation is unique to the first electronic device and necessary for completion of the cooperative operation and causing the second electronic device to perform a second operation of the cooperative operation, wherein the second operation is unique to the second electronic device and necessary for completion of the cooperative operation, the first operation and the second operation corresponding to the heterogeneous information extracted from a static external feature of the subject, wherein the static external feature is a finger of the hand that is static relative to at least one other feature of the subject, and one or more of the first operation and the second operation is determined based on a relative position of the static external feature on the subject.

17. The apparatus of claim 16, further comprising:
a wireless module capable of communicating with a second electronic device, and
wherein, in response to extraction of the form feature information, a cooperative operation control section establishes communication with the second electronic device to exchange the form feature information with the electronic device.

18. The apparatus of claim 16, wherein the subject comprises arms, and the form feature information comprises external features of right and left arms.

19. A program product comprising a non-transitory computer readable storage medium that stores code executable by a processor, the executable code comprising code to perform:
  capturing an image of a hand of a subject with a first camera equipped in a first electronic device and with a second camera equipped in a second electronic device;
  recognizing form feature information of the hand from the captured images;
  extracting common information identifying the hand as a left or right hand and further identifying a palm-toward or palm-away orientation of the hand and heterogeneous information associated with an asymmetrical aspect of the hand from the form feature information, the common information captured by both the first camera and the second camera, the common information corresponding to a common operation associated with both the first electronic device and the second electronic device, the heterogeneous information captured by at least one of the first camera and the second camera and corresponding to an operation unique to one of the first electronic device and the second electronic device;
  comparing the captured images to determine if the common information from the captured images comprises a match;
  in response to a determination that the common information from the captured images forms the match, identifying the first electronic device and the second electronic device as eligible; and
  identifying a cooperative operation corresponding to the common information from the captured images and causing the first electronic device to perform a first operation of the cooperative operation, wherein the first operation is unique to the first electronic device and necessary for completion of the cooperative operation and causing the second electronic device to perform a second operation of the cooperative operation, wherein the second operation is unique to the second electronic device and necessary for completion of the cooperative operation, the first operation and the second operation corresponding to the heterogeneous information extracted from a static external feature of the subject, wherein the static external feature is a finger of the hand that is static relative to at least one other feature of the subject, and one or more of the first operation and the second operation is determined based on a relative position of the static external feature on the subject.

* * * * *